US009706438B1

(12) United States Patent
Kadmon et al.

(10) Patent No.: US 9,706,438 B1
(45) Date of Patent: Jul. 11, 2017

(54) SYSTEM, METHOD, AND COMPUTER PROGRAM FOR CONGESTION RELIEF IN A COMMUNICATION NETWORK

(71) Applicant: Amdocs Software Systems Limited, Dublin (IE)

(72) Inventors: Yaron Shlomo Kadmon, Kfar Saba (IL); Ronen Kenig, Hod Hasharon (IL); Dori Ben-Moshe, Ramat Hasharon (IL); Meir Oren Levy, Givat-Chen (IL); Nadav Kremer, Hadera (IL)

(73) Assignees: Amdocs Software Systems Limited, Dublin 3 (IE); Amdocs Development Limited, Limassol (CY)

( * ) Notice: Subject to any disclaimer, the term of this patent is extended or adjusted under 35 U.S.C. 154(b) by 0 days.

(21) Appl. No.: 14/618,980

(22) Filed: Feb. 10, 2015

(51) Int. Cl.
  *H04W 72/00* (2009.01)
  *H04W 28/08* (2009.01)
  *H04W 28/02* (2009.01)
  *H04W 84/18* (2009.01)

(52) U.S. Cl.
  CPC ....... *H04W 28/08* (2013.01); *H04W 28/0289* (2013.01); *H04W 84/18* (2013.01)

(58) Field of Classification Search
  CPC .. H04W 28/08; H04W 28/0289; H04W 84/18
  USPC ........................................................ 455/453
  See application file for complete search history.

(56) References Cited

U.S. PATENT DOCUMENTS

| 6,400,335 | B1 * | 6/2002 | Weaver | H01Q 1/246 |
| | | | | 342/372 |
| 7,142,868 | B1 * | 11/2006 | Broyles | H04W 16/00 |
| | | | | 455/418 |
| 7,400,889 | B2 * | 7/2008 | Balasubramanian | H04L 1/0009 |
| | | | | 455/450 |
| 8,111,253 | B2 * | 2/2012 | Rao | H04W 28/16 |
| | | | | 345/156 |
| 2007/0281711 | A1 * | 12/2007 | Matta | H04L 47/10 |
| | | | | 455/453 |

(Continued)

*Primary Examiner* — Charles Shedrick
(74) *Attorney, Agent, or Firm* — Zilka-Kotab, PC

(57) ABSTRACT

A system, method, and computer program product are provided for congestion relief in a communication network. In use, information is collected for all subscribers utilizing at least one service in at least one of a plurality of sectors associated with a communication network, the information including at least an identity associated with each subscriber and a service type being utilized by each subscriber. Further, the collected information is aggregated to determine a sector status for each of the plurality of sectors, the sector status for each of the plurality of sectors including a total number of active subscribers for a corresponding sector, a service distribution associated with the corresponding sector, and a bandwidth consumption associated with the corresponding sector. Additionally, specific business data associated with the active subscribers in each of the plurality of sectors is received. Furthermore, it is determined whether to initiate a congestion relief action for any of the plurality of sectors based on the sector status for each of the plurality of sectors and the specific business data associated with each of the plurality of sectors. Moreover, the congestion relief action is initiated for each of the plurality of sectors in which it is determined to initiate the congestion relief action.

11 Claims, 5 Drawing Sheets

(56) References Cited

U.S. PATENT DOCUMENTS

| | | | | |
|---|---|---|---|---|
| 2008/0004034 A1* | 1/2008 | Takata | .................. | H04W 16/04 |
| | | | | 455/453 |
| 2010/0027426 A1* | 2/2010 | Nair | ...................... | H04W 28/16 |
| | | | | 370/238 |
| 2011/0252111 A1* | 10/2011 | Murray | ................. | H04W 84/18 |
| | | | | 709/217 |
| 2011/0286437 A1* | 11/2011 | Austin | .................... | H04W 4/02 |
| | | | | 370/338 |
| 2012/0039175 A1* | 2/2012 | Sridhar | ................. | H04L 47/125 |
| | | | | 370/236 |

\* cited by examiner

SYSTEM, METHOD, AND COMPUTER PROGRAM FOR CONGESTION RELIEF IN A COMMUNICATION NETWORK

FIELD OF THE INVENTION

The present invention relates to communication networks, and more particularly self-optimized networks.

BACKGROUND

As demands on today's networks grow, the ability of communication service providers (CSPs) to plan and manage radio access network (RAN) capacity, and to deliver superior service to customers, is being severely challenged. A few technologies have been recently introduced in order to help CSPs optimize available RAN capacity and to prevent RAN congestion as much as possible.

One of these technologies is SON (Self-Optimized Network) that has a few functions that automate the ongoing activities of RAN sectors (e.g. automatic neighboring configuration, capacity optimization, on demand load balancing, on demand self-configuration, etc.).

One of these SON functions is MLB (Mobile Load Balancing). While MLB has been working successfully helping to prevent RAN congestion, it lacks one essential component. This component is subscriber awareness.

There is thus a need for addressing these and/or other issues associated with the prior art.

SUMMARY

A system, method, and computer program product are provided for congestion relief in a communication network. In use, information is collected for all subscribers utilizing at least one service in at least one of a plurality of sectors associated with a communication network, the information including at least an identity associated with each subscriber and a service type being utilized by each subscriber. Further, the collected information is aggregated to determine a sector status for each of the plurality of sectors, the sector status for each of the plurality of sectors including a total number of active subscribers for a corresponding sector, a service distribution associated with the corresponding sector, and a bandwidth consumption associated with the corresponding sector. Additionally, specific business data associated with the active subscribers in each of the plurality of sectors is received. Furthermore, it is determined whether to initiate a congestion relief action for any of the plurality of sectors based on the sector status for each of the plurality of sectors and the specific business data associated with each of the plurality of sectors. Moreover, the congestion relief action is initiated for each of the plurality of sectors in which it is determined to initiate the congestion relief action.

DETAILED DESCRIPTION

Figure 1:
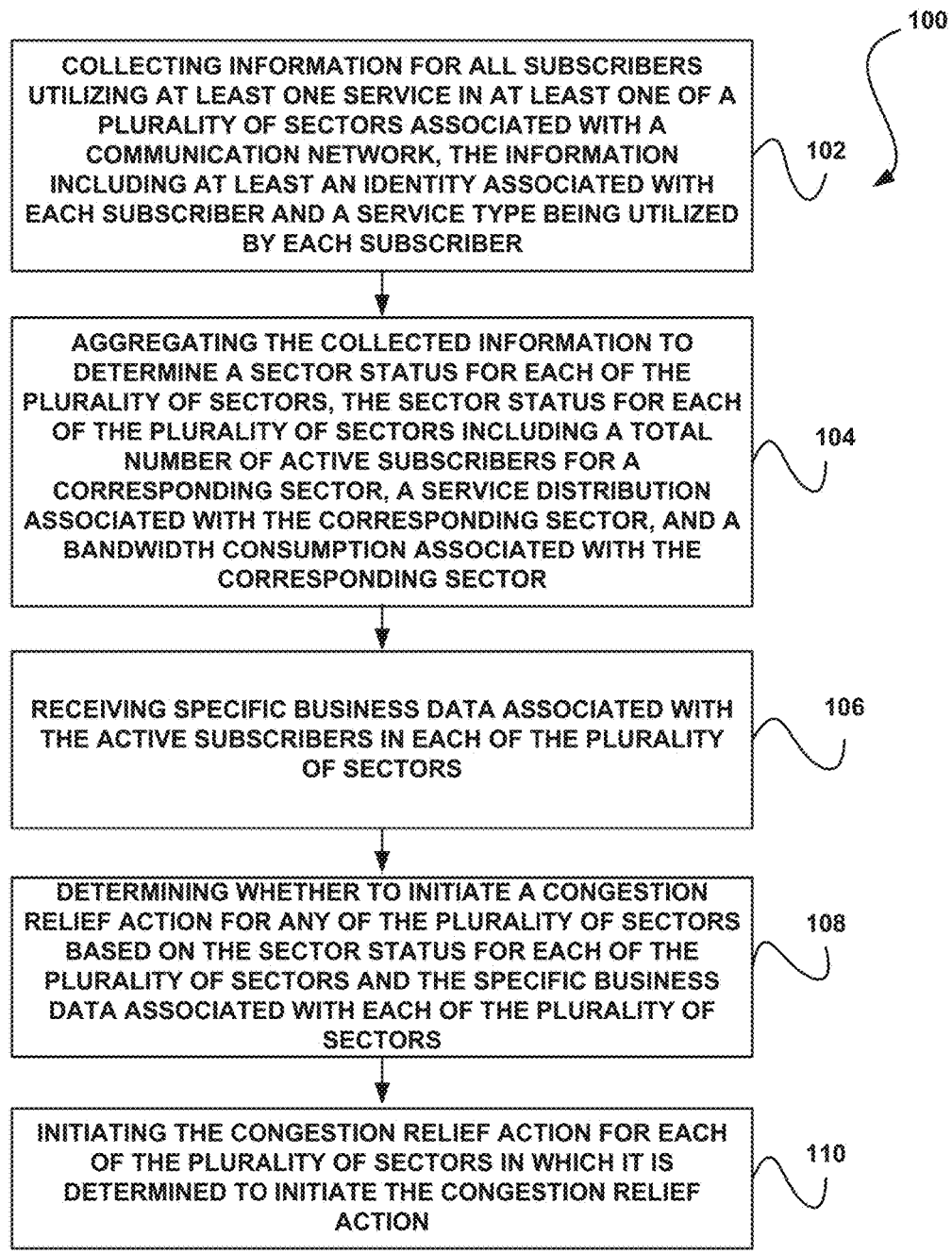
FIG. 1 illustrates a method for congestion relief in a communication network, in accordance with one embodiment.

FIG. 1 illustrates a method 100 for congestion relief in a communication network, in accordance with one embodiment.

As shown, information is collected for all subscribers utilizing at least one service in at least one of a plurality of sectors associated with a communication network. See operation 102. The collected information includes at least an identity associated with each subscriber and a service type being utilized by each subscriber.

The identities associated with the subscribers may include any type of identifier, such as an International Mobile Subscriber Identity (IMSI) or mobile phone number, etc. The service type may be associated with voice and/or data, etc. For example, the service type may include a voice session, an Internet session, and/or a video session, etc.

The information collected may include various other information also. For example, the information may include bandwidth usage information, location specific information, and/or various other information. The sectors may include any boundary or geographical location defined by a communication service provider (CSP) associated with the communication network.

As shown further in FIG. 1, the collected information is aggregated to determine a sector status for each of the plurality of sectors. See operation 104. The sector status for each of the plurality of sectors includes a total number of active subscribers for a corresponding sector, a service distribution associated with the corresponding sector, and a bandwidth consumption associated with the corresponding sector.

Additionally, specific business data associated with the active subscribers in each of the plurality of sectors is received. See operation 106. In one embodiment, the specific business data for the active subscribers may be received from a business support system (BSS) associated with the communication network.

The business data may include any information associated with the subscribers. For example, the specific business data may include a subscriber name, a subscriber age, and/or a subscriber type (e.g. a corporate subscriber, a VIP subscriber, a subscriber requiring special attention, etc.).

The specific business data may also include a churn alert indicator associated with a subscriber, service package information associated with the subscriber, revenue attributed to the subscriber, a date the subscriber purchased a service associated with the communication network, a number of complaints made by the customer, and/or an indication of family members of the subscriber whom are customers of the communication network, etc.

In one embodiment, the specific business data may also include historical information associated with the active subscribers. In this case, the historical information may include service consumption history, service usage history, and/or a percentage of service type consumption, etc. The service consumption history may be utilized to determine how long the active subscribers are likely to consume a currently used service.

Furthermore, it is determined whether to initiate a congestion relief action for any of the plurality of sectors based on the sector status for each of the plurality of sectors and the specific business data associated with each of the plurality of sectors. See operation 108. In one embodiment, determining whether to initiate the congestion relief action for any of the plurality of sectors may include determining whether one or more business policies have been violated based on the sector status for each of the plurality of sectors and the specific business data associated with each of the plurality of sectors.

Moreover, the congestion relief action is initiated for each of the plurality of sectors in which it is determined to initiate the congestion relief action. See operation 110.

The congestion relief action may include any network command/action for relieving network congestion associated with a particular sector. For example, the congestion relief action may include limiting additional use of at least one service for a sector or prohibiting additional use of the service for the sector. For example, the congestion relief action may include limiting or prohibiting additional subscriber use of at least one service for a first sector by allowing at least one second sector to handle the additional subscriber use of the service.

Further, in one embodiment, initiating the congestion relief action may include sending a self-optimization network (SON) request to a SON system for initiating the congestion relief action. In this case, the SON request may include a variety of parameters associated with the congestion relief action. For example, the parameters may include a sector identifier, a neighbor sector status, and/or a congestion relief action level indicator, etc.

The congestion relief action level indicator may indicate a level of aggressiveness for dealing with the congestion, such as a first level of action or a second level of action. In one embodiment, the first level of action may include preventing additional subscribers from receiving service from a sector corresponding to the sector identifier. In this case, the second level of action may include decreasing sector boundaries of the sector corresponding to the sector identifier.

In one embodiment, the method 100 may further include determining whether the congestion relief action was successful. If the congestion relief action was not successful, another congestion relief action may be initiated. In some cases, this may include, for example, escalating from the first level of action to the second level of action.

Thus, in one embodiment, the method 100 may be utilized to implement Customer Value Driven SON. Customer Value Driven SON is a solution that allows on-demand SON MLB (Mobile Load Balancing) activation based on CSP policy rules as opposed to relying only on network congestion indicators. In order to excel in customer experience, it is essential to relieve sector congestions based on subscriber types that are in the area, and based on the service they consume.

The solution is based on RT capability to collect and analyze which subscribers are at which sector at any moment and what service they consume. This information is aggregated and is compared with CSP policy for congestion relief. This allows CSPs to: define new services and to ensure its SLA/QoE; perform congestion functions in the network based on business decisions; and monitor subscriber experience, post MLB activation, and act accordingly.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

As demands on today's networks grow, the ability of communication service providers to plan and manage radio access network capacity, and to deliver superior service to customers, is being severely challenged. A few technologies have been recently introduced in order to help CSPs optimize available RAN capacity and to prevent RAN congestion as much as possible.

One of these technologies is SON, which has a few functions that automate the ongoing activities of RAN sectors (e.g. automatic neighboring configuration, capacity optimization, on demand load balancing, on demand self-configuration, etc.).

One of these SON functions is Mobile Load Balancing. While MLB has been working successfully helping to prevent RAN congestion, it lacks one essential component—subscriber awareness (e.g. which subscribers are at the sector and what service they consume at the time of SON activation, etc.).

Currently, SON MLB is activated based upon configurable congestion indicators. These indicators are essentially sector performance parameters or a group of parameters that together create network key performance indicators (KPIs). Once MLB is activated, it has its own internal algorithms that attempt to relieve congestion from a given sector by looking at the sector as well as its neighbors and making a "coverage decision" for the entire area.

In order to achieve customer experience driven SON, additional parameters need to be evaluated such as: determining the number of subscribers that are in a given sector at the time of MLB activation; determining activities of the subscriber (e.g. watching a video, surfing the Internet, having a call, etc.); determining whether the CSP has a policy for service prioritization (e.g. Facebook users under a certain age need special treatment for a given area at a given time, etc.); determining whether there are corporate users in a given sector that need special care; determining whether there is a risk of hurting subscribers who watch video in a certain location; and determining whether the accumulated revenues of all subscribers in a given sector at a given time mean that this sector needs special care immediately (e.g. determining whether the accumulated revenues of all subscribers in a given sector at a given time are more than 20M USD per month means that this sector needs special care right now, etc.); etc.

Excelling in customer experience is one of the obvious ways for CSPs to differentiate their service, and therefore expanding SON MLB to be "customer experience driven" is essential.

Adding subscriber awareness to MLB requires adding real time analysis of the services subscribers consume all the time in a given geographical area.

Customer Value Driven SON should allow CSPs to: launch MLB based on real time subscriber activity at a given sector; define business policy and conditions for MLB activation; define the business conditions for aggressively activating MLB; define priority in services (e.g. video over data, the type of video, subscriber age, type, etc.); introduce more aggressive packages to subscribers and commit to SLA/QoE per location/application/time of day/special event, etc.; and monitor the results of SON and act accordingly (e.g. notify subscribers upon an issue, etc.).

Figure 2:
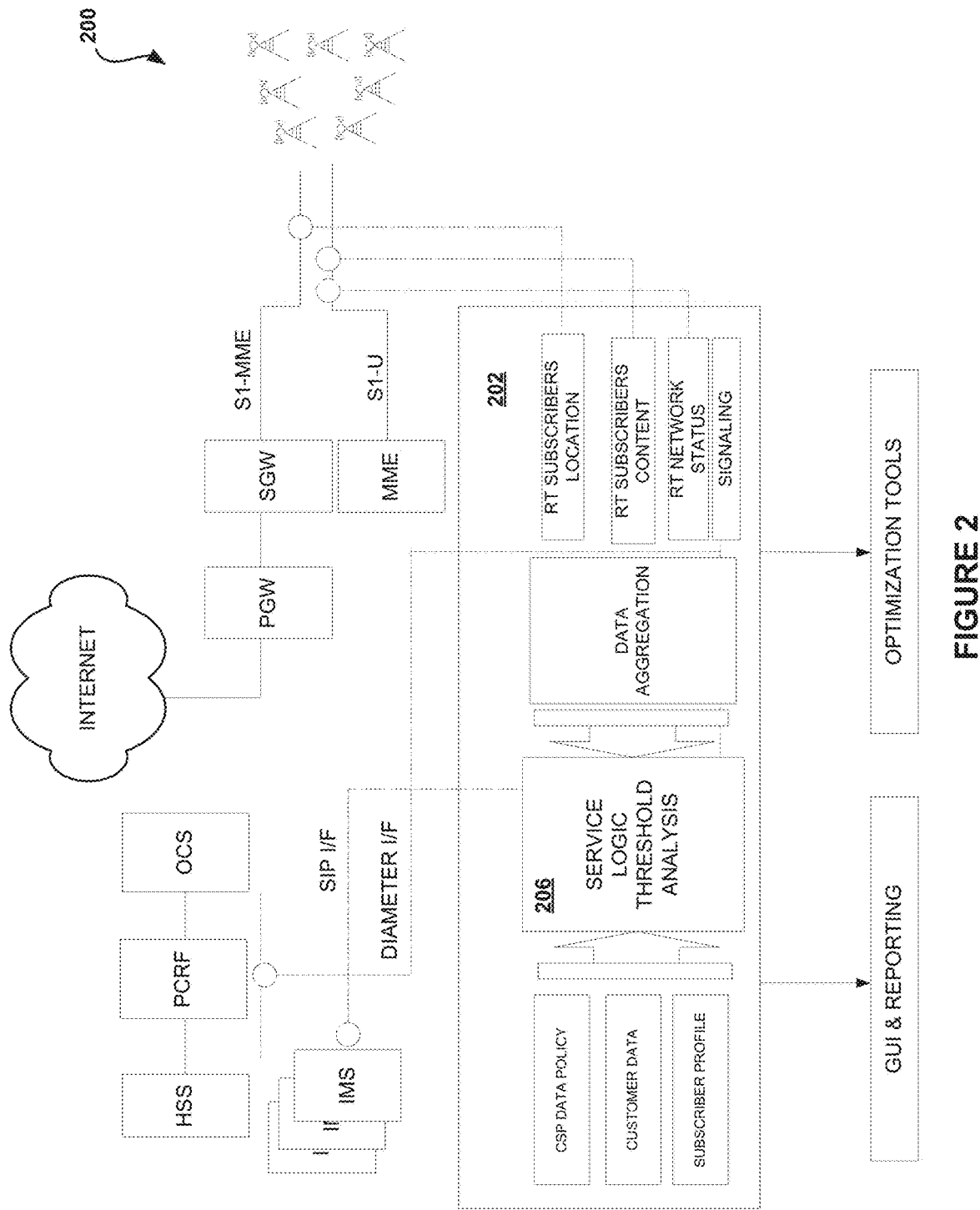
FIG. 2 illustrates a system architecture for Customer Value Driven SON, in accordance with one embodiment.

FIG. 2 illustrates a system architecture 200 for Customer Value Driven SON, in accordance with one embodiment. As an option, the system architecture 200 may be implemented in the context of the details of FIG. 1. Of course, however, the system architecture 200 may be implemented in the context of any desired environment. Further, the aforementioned definitions may equally apply to the description below.

The system architecture 200 includes a per sector subscriber collection process/module 202. The module 202 implements a process that constantly collects information of all subscribers that consume a service from a given sector. The module 202 performs this for all sectors all the time. The module 202 is also capable of collecting information associated with subscribers that are in motion and that are about to enter a sector.

On startup, the module 202 collects the initial status per sector and then maintains updates. This information may be constantly passed on to a higher level RT application that performs subscriber aggregations and analysis.

The module 202 may also implement a per sector subscriber service usage collection process. This process may associate subscribers with the current service they consume. The service may include, for example, voice sessions, internet sessions including web site use (to allow service prioritization, etc.), and video sessions including web site/movie use (to allow service prioritization, etc.). This information may be passed on to a higher level service logic application that performs subscriber aggregations and analysis.

The system architecture 200 may also provide for on demand integration with BSS. For example, for every subscriber that consumes a service at a given time within a given sector, additional information may be collected. This information may include subscriber name, age, type (e.g. corporate, VIP, special attention, etc.), churn alert (e.g. yes or no), acquired service packages, revenues per month, date of joining the CSP, number of complaints in the last 30 days, a number of times the subscriber called the call center, other family members that are CSP customers, and/or various other information. This is information may be used for implementing a CSP business policy decision for congestion relief.

The system architecture 200 may also provide for on demand integration with a historical subscriber profile database. In this case, for every subscriber that consumes a service, additional historical information may be collected. This information may include, for example, service consumption history in the sector (e.g. in the last day/week, etc.), usage pattern history (e.g. is this subscriber known to use a certain service in a given sector at a given time, etc.), a percentage of service type consumption in the last month (voice, data, video), and/or various other information. This information may be used to help predict subscriber digital behavior in the coming minutes (i.e. is it likely that he/she will continue watching video in the next N minutes, etc.).

The system architecture 200 may also include an RT Subscribers Service Logic module 206. This may include an RT Service Logic component that for every sector calculates the number of subscribers consuming a service, the distribution of service consumption type (i.e. voice, data, video), additional information including subscribers age, type (e.g. corporate, etc.) and service usage type (e.g. video, etc.), and/or additional information including subscriber usage pattern (e.g. last week X percentage of these subscribers used video the same time for at least 30 minutes, etc.).

This RT Subscribers Service Logic module 206 interfaces with a CSP policy database for congestion relief in order to obtain the business policies. The RT Subscribers Service Logic module 206 then calculates whether or not a business policy has been violated.

Once a business policy has been violated, the RT Subscribers Service Logic module 206 considers initiating a SON request to the relevant sector. Once the RT Subscribers Service Logic module 206 decides that a SON activation is required, it interfaces with a SON system and instructs the SON system to initiate SON MLB with the relevant parameters (e.g. sector, neighbor status, how aggressive, etc.).

This RT Subscribers Service Logic module 206 continues to interface with the SON system while monitoring the results of the activity in order to decide whether or not additional SON initiations are required.

Once the business target has been achieved (e.g. after SON is done, less than 20,000 users are now watching video in the sector, etc.), the RT Subscribers Service Logic module 206 informs the SON system to stop.

The CSP policy database may include a basic CSP policy database for activating Customer Value Driven SON. The CSP policy database is where CSP policies are defined.

An example of such a policy may be, for a new service that has been recently introduced, and for every sector at any given moment, if certain conditions are mutually met, initiate an MLB request to the SON system. As an example, such conditions may include: IF more than 50,000 subscribers who registered to the new service are now watching video from a given sector; AND more than 50% of them watch video from a certain web site; AND 10% of them are corporate users.

The SON system performs SON commands. In one embodiment, the SON system may be integrated with the RT Subscribers Service Logic module 206. The communication may include a request to initiate MLB for a given sector. Also, for the given sector, the communication may include an indicator as to how aggressive to activate MLB (i.e. $1^{st}$ level relief, $2^{nd}$ level relief, etc.), and information about neighboring sectors that should not be changed.

The SON system may execute MLB once and will wait for additional instructions from the RT Subscribers Service Logic module 206. If post MLB, the SON system receives unplanned congestion indicators for the relevant sectors, it will pass them back to the RT Subscribers Service Logic module 206. This will require a further decision of which policy to enforce.

The system architecture 200 also includes a post SON reporting module. This component looks at every sector post MLB, together with the CSP policy database, and monitors relevant subscribers' experience post MLB. Relevant subscribers may include those that were part of the reason for activating the SON MLB for the sector. This is to ensure that CSP policies have been achieved and that relevant subscribers received the required quality during their service consumption. To achieve this goal, service quality indicators may be constantly collected post MLB (e.g. packet loss, packet delay, jitter, re-transmit, drop, etc.). In the case that service quality was not achieved, or QoE has been damaged, a message to subscribers may be sent to their device.

Figure 3:
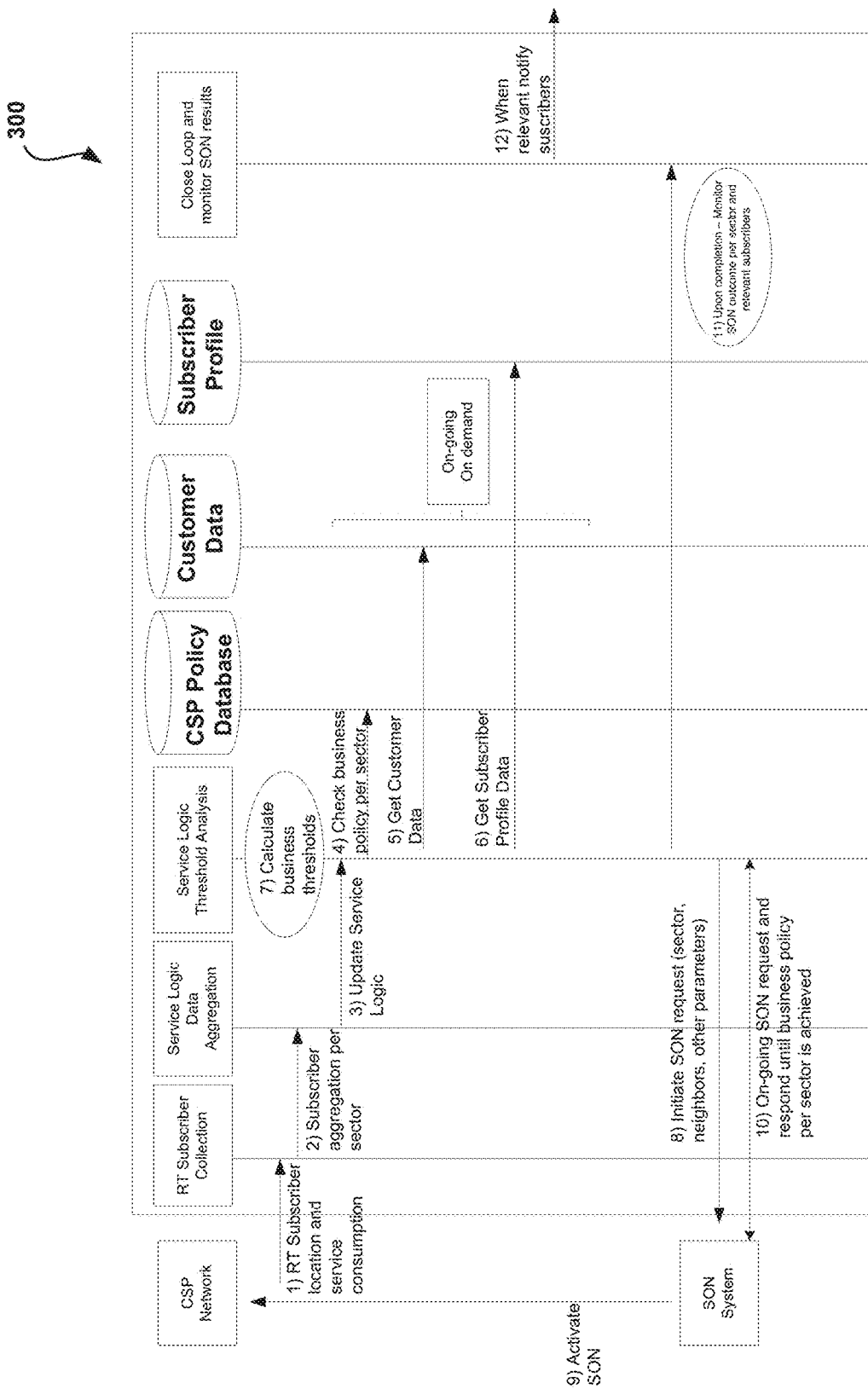
FIG. 3 illustrates a system flow diagram for Customer Value Driven SON, in accordance with one embodiment.

FIG. 3 illustrates a system flow diagram 300 for Customer Value Driven SON, in accordance with one embodiment. As an option, the system flow diagram 300 may be implemented in the context of the details of the previous Figures. Of course, however, the system flow diagram 300 may be implemented in the context of any desired environment. Further, the aforementioned definitions may equally apply to the description below.

As shown, for every sector, an RT subscriber collection component discovers subscribers that consume a service at the sector, as well as their service type. See step 1. This data is aggregated per sector. See step 2. This is where subscribers and services are aggregated per sector. The result is that for every sector, the total number of active subscribers is known, as well as their service distribution and bandwidth consumption.

The service logic component/module is updated with the information. See step 3. On startup, the aggregated information may be stored at the service logic component. After that, ongoing changes may be maintained and updated.

Further, the service logic component checks whether sector status "violates" a business rule (e.g. more than 2,000 Facebook users under 24 years old are now consuming video for the last 2 minutes, etc.). See step 4. The service logic component interfaces with a CSP customer database to further collect information that helps determine whether to activate SON (e.g. some of the users may have a churn alert or may have already called the call center a few times during last month, etc.). See step 5.

Subscriber consumption history is collected to help perform basic prediction with regards to how long subscribers are likely to consume their current service. See step 6.

The service logic component then has usage consumption per sector as well as supporting business data and is able to calculate whether or not to initiate a congestion relief request (i.e. instruct the SON system to take action). See step 7.

If it is determined to initiate a congestion relief request, the service logic component initiates a request to the SON system. See step 8. In various embodiments, the request may include a sector ID, a level of relief requested (e.g. $1^{st}$ or $2^{nd}$ level relief, etc.), and/or an instruction of how to approach neighboring sectors (e.g. do not change one neighbor at all, etc.).

In one embodiment, the level of relief may include a first level of relief that includes preventing additional subscribers from receiving service from this sector. Additionally, a second level of relief may include obtaining RT subscribers' locations in the sector, and utilizing this information to take smarter MLB decisions. For example, if the threshold of HD sessions in the sector was not relieved, or a total "subscribers value" that consume service from the sector did not decrease, then based on CSP policy, SON MLB second level relief might be initiated, which may include decreasing sector boundaries.

The SON system checks whether or not network congestion indicators occurred on the sector within a predefined amount of time (e.g. in the last 30 minutes, etc.). See step 9. If no network congestion indicators have occurred, the SON system performs the request and waits for the next time network congestion indicators will be calculated (e.g. in 30 minutes, etc.). The SON system reports back the results to the service logic component.

After MLB is performed, the service logic component continues getting data from the sector and calculates whether or not the business policy rule that had initiated SON has been achieved. See step 10. If the outcome is satisfactory then this event is successfully completed. If further SON initiations are required, then CSP rules will dictate whether additional SON requests will take place before the next round of congestion indicators are calculated and available.

Once the service logic component receives confirmation from the SON system that the SON request has been performed, it checks QoE indicators (e.g. packet loss, delay, jitter, re-transmit, etc.) from the relevant subscribers that were the reason for the SON initiation. See step 11. It uses this calculation to report back to a CRM that a business incident has occurred but subscriber SLA has not been violated.

In the case that post SON event subscriber QoE has been damaged or a business rule was not dealt with properly, a relevant message is sent to a subscriber device or to a CSP policy database. See step 12.

Figure 4:
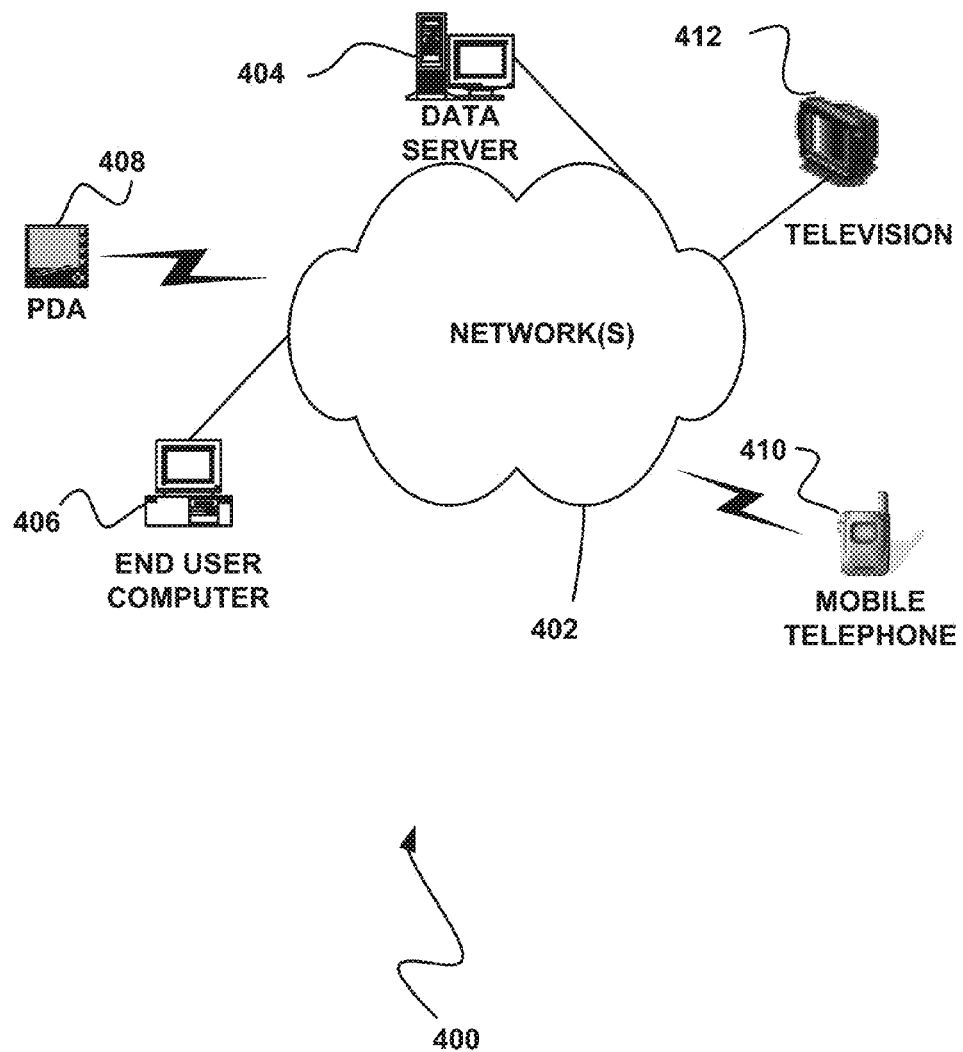
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
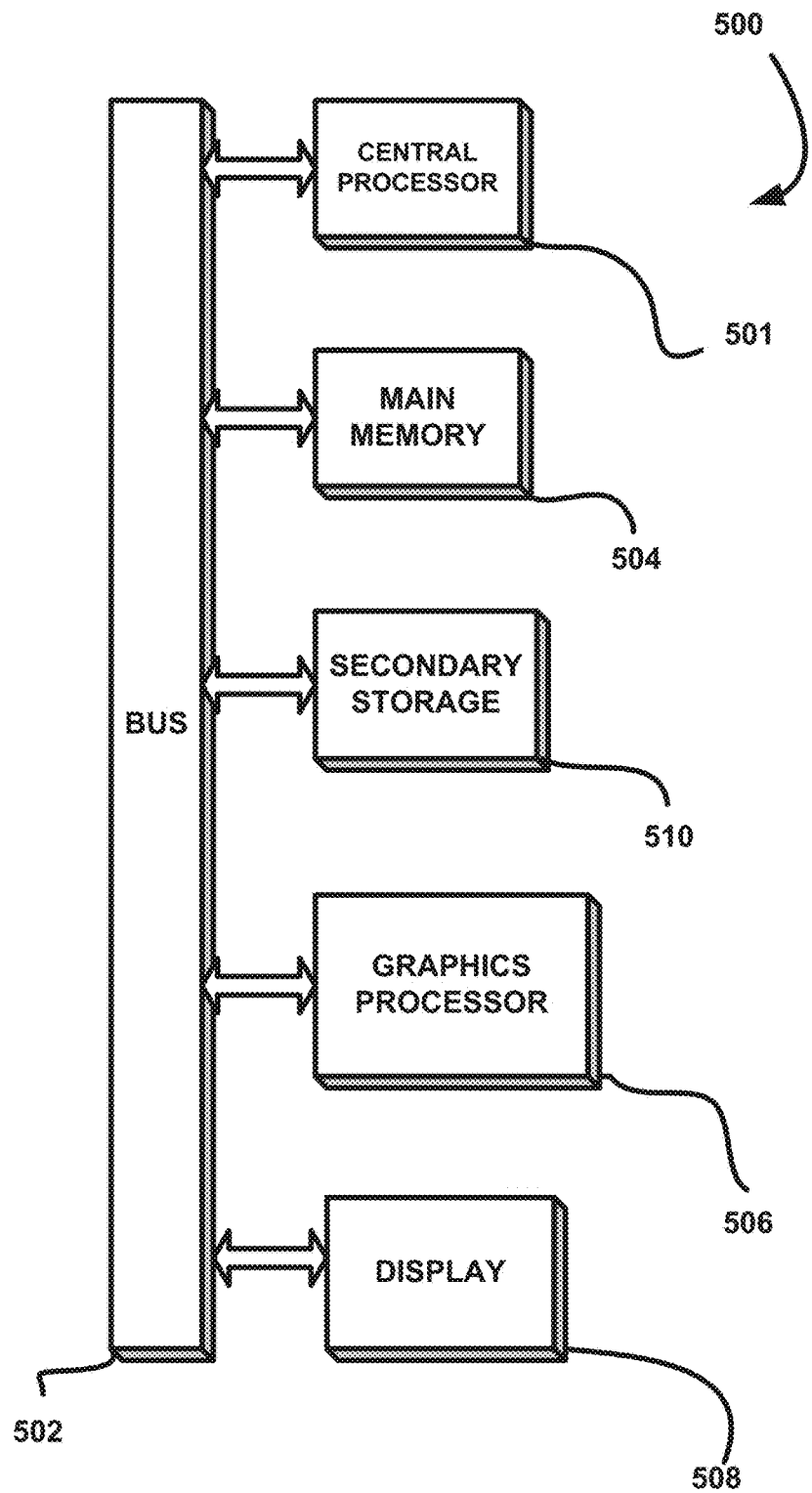
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
collecting information for all subscribers utilizing at least one service across a plurality of sectors associated with a communication network, each sector of the plurality of sectors being defined by a geographical boundary within a communication network and the information including at least an identity associated with each subscriber and a service type being utilized by each subscriber;

aggregating the collected information, by each sector of the plurality of sectors, to determine a sector status for each of the plurality of sectors, the sector status for each of the plurality of sectors including a total number of active subscribers for a corresponding sector, a distribution of consumption for each of a plurality of service types within the corresponding sector, and a bandwidth consumption associated with the corresponding sector;

receiving specific business data associated with the subscribers in each of the plurality of sectors;

identifying, from a communication service provider policy database, a policy with conditions for initiating congestion relief;

determining that the sector status of one of the sectors and the specific business data associated with the subscribers utilizing the at least one service in the one of the sectors meets the conditions included in the policy;

responsive to determining that the conditions included in the policy are met, initiating a first congestion relief action by issuing a first request for the first congestion relief action that includes:
  an identifier of the one of the sectors,
  a first instruction for handling neighboring sectors to the one of the sectors, and
  a first congestion relief action level indicator that specifies the first congestion relief action as a first of a plurality of levels of congestion relief; responsive to the first request;
  determining that the first of the plurality of levels of congestion relief includes preventing additional subscribers from receiving service, and
  executing the first congestion relief action by preventing the additional subscribers from receiving service from the one of the sectors and by following the first instruction for handling the neighboring sectors to the one of the sectors;

after executing the first congestion relief action, determining that the conditions included in the specific business data are still met by a current sector status of the one of the sectors and as a result that the first congestion relief action was not successful;

responsive to determining that the first congestion relief action was not successful, initiating a second congestion relief action by issuing a second request for the second congestion relief action that includes:
  the identifier of the one of the sectors,
  a second instruction for handling the neighboring sectors to the one of the sectors, and
  a second congestion relief action level indicator that specifies the second congestion relief action as a second of a plurality of levels of congestion relief; responsive to the second request;
  determining that the second of the plurality of levels of congestion relief includes decreasing a boundary of the one of the sectors, and
  executing the second congestion relief action by decreasing the boundary of the one of the sectors and by following the second instruction for handling the neighboring sectors to the one of the sectors;

after executing the second congestion relief action, calculating quality of experience (QoE) indicators including packet loss, delay, and jitter for the subscribers utilizing the at least one service in the one of the sectors; and when the calculated (QoE) indicators indicate that QoE for the subscribers utilizing the at least one service in the one of the sectors has been damaged after executing the first and second congestion relief actions, sending a message to the communication service provider policy database.

2. The method of claim 1, wherein the service type includes at least one of a voice session, an Internet session, or a video session.

3. The method of claim 1, wherein the specific business data includes at least one of a subscriber name, a subscriber age, and a subscriber type.

4. The method of claim 3, wherein the specific business data further includes at least one of a churn alert indicator associated with a subscriber, service package information associated with the subscriber, revenue attributed to the subscriber, a date the subscriber purchased a service associated with the communication network, a number of complaints made by a customer, and an indication of family members of the subscriber whom are customers of the communication network.

5. The method of claim 1, wherein the specific business data includes historical information associated with the subscribers.

6. The method of claim 5, wherein the historical information includes at least one of service consumption history, service usage history, and a percentage of service type consumption.

7. The method of claim 6, wherein the service consumption history is utilized to determine how long the subscribers are likely to consume a currently used service.

8. The method of claim 1, wherein the first request is a self-optimization network (SON) request to a SON system for initiating the first congestion relief action.

9. The method of claim 1, wherein the communication service provider policy database stores a plurality of policies for congestion relief, the policies specific to particular service activities of the subscribers, service prioritization, types of the subscribers, and accumulated revenues of the subscribers.

10. A computer program product embodied on a non-transitory computer readable medium, comprising:
  computer code for collecting information for all subscribers utilizing at least one service across a plurality of sectors associated with a communication network, each sector of the plurality of sectors being defined by a geographical boundary within a communication network and the information including at least an identity associated with each subscriber and a service type being utilized by each subscriber;
  computer code for aggregating the collected information, by each sector of the plurality of sectors, to determine a sector status for each of the plurality of sectors, the sector status for each of the plurality of sectors including a total number of active subscribers for a corresponding sector, a distribution of consumption for each of a plurality of service types within the corresponding sector, and a bandwidth consumption associated with the corresponding sector;
  computer code for receiving specific business data associated with the subscribers in each of the plurality of sectors;

computer code for identifying, from a communication service provider policy database, a policy with conditions for initiating congestion relief;
computer code for determining that the sector status of one of the sectors and the specific business data associated with the subscribers utilizing the at least one service in the one of the sectors meets the conditions included in the policy;
computer code, responsive to determining that the conditions included in the policy are met, for initiating a first congestion relief action by issuing a first request for the first congestion relief action that includes:
an identifier of the one of the sectors,
a first instruction for handling neighboring sectors to the one of the sectors, and
a first congestion relief action level indicator that specifies the first congestion relief action as a first of a plurality of levels of congestion relief; computer code, responsive to the first request, for:
determining that the first of the plurality of levels of congestion relief includes preventing additional subscribers from receiving service, and
executing the first congestion relief action by preventing the additional subscribers from receiving service from the one of the sectors and by following the first instruction for handling the neighboring sectors to the one of the sectors;
computer code for, after executing the first congestion relief action, determining that the conditions included in the specific business data are still met by a current sector status of the one of the sectors and as a result that the first congestion relief action was not successful;
computer code, responsive to determining that the first congestion relief action was not successful, for initiating a second congestion relief action by issuing a second request for the second congestion relief action that includes:
the identifier of the one of the sectors,
a second instruction for handling the neighboring sectors to the one of the sectors, and
a second congestion relief action level indicator that specifies the second congestion relief action as a second of a plurality of levels of congestion relief;
responsive to the second request:
determining that the second of the plurality of levels of congestion relief includes decreasing a boundary of the one of the sectors, and
executing the second congestion relief action by decreasing the boundary of the one of the sectors and by following the second instruction for handling the neighboring sectors to the one of the sectors:
computer code for, after executing the second congestion relief action, calculating quality of experience (QoE) indicators including packet loss, delay, and jitter for the subscribers utilizing the at least one service in the one of the sectors; and
computer code for, when the calculated (QoE) indicators indicate that QoE for the subscribers utilizing the at least one service in the one of the sectors has been damaged after executing the first and second congestion relief actions, sending a message to the communication service provider policy database.

11. A system comprising:
a memory system; and
one or more processing cores coupled to the memory system and that are each configured to:
collect information for all subscribers utilizing at least one service across a plurality of sectors associated with a communication network, each sector of the plurality of sectors being defined by a geographical boundary within a communication network and the information including at least an identity associated with each subscriber and a service type being utilized by each subscriber;
aggregate the collected information, by each sector of the plurality of sectors, to determine a sector status for each of the plurality of sectors, the sector status for each of the plurality of sectors including a total number of active subscribers for a corresponding sector, a distribution of consumption for each of a plurality of service types within the corresponding sector, and a bandwidth consumption associated with the corresponding sector;
receive specific business data associated with the subscribers in each of the plurality of sectors;
identify, from a communication service provider policy database, a policy with conditions for initiating congestion relief;
determine that the sector status of one of the sectors and the specific business data associated with the subscribers utilizing the at least one service in the one of the sectors meets the conditions included in the policy;
responsive to determining that the conditions included in the policy are met, initiate a first congestion relief action by issuing a first request for the first congestion relief action that includes:
an identifier of the one of the sectors,
a first instruction for handling neighboring sectors to the one of the sectors, and
a first congestion relief action level indicator that specifies the first congestion relief action as a first of a plurality of levels of congestion relief;
responsive to the first request:
determine that the first of the plurality of levels of congestion relief includes preventing additional subscribers from receiving service, and
execute the first congestion relief action by preventing the additional subscribers from receiving service from the one of the sectors and by following the first instruction for handling the neighboring sectors to the one of the sectors;
after executing the first congestion relief action, determine that the conditions included in the specific business data are still met by a current sector status of the one of the sectors and as a result that the first congestion relief action was not successful;
responsive to determining that the first congestion relief action was not successful, initiate a second congestion relief action by issuing a second request for the second congestion relief action that includes:
the identifier of the one of the sectors,
a second instruction for handling the neighboring sectors to the one of the sectors, and
a second congestion relief action level indicator that specifies the second congestion relief action as a second of a plurality of levels of congestion relief;
responsive to the second request:
determine that the second of the plurality of levels of congestion relief includes decreasing a boundary of the one of the sectors, and
execute the second congestion relief action by decreasing the boundary of the one of the sectors and by following the second instruction for handling the neighboring sectors to the one of the sectors;

after executing the second congestion relief action, calculate quality of experience (QoE) indicators including packet loss, delay, and jitter for the subscribers utilizing the at least one service in the one of the sectors; and when the calculated (QoE) indicators indicate that QoE for the subscribers utilizing the at least one service in the one of the sectors has been damaged after executing the first and second congestion relief actions, send a message to the communication service provider policy database.

* * * * *